United States Patent [19]

Sokoloff et al.

[11] Patent Number: 5,101,447

[45] Date of Patent: Mar. 31, 1992

[54] METHOD AND APPARATUS FOR OPTICALLY READING PRE-PRINTED SURVEY PAGES

[75] Inventors: Arny I. Sokoloff, Downsview; Michael A. Grossman, Toronto, both of Canada

[73] Assignee: Automated Tabulation Inc., Toronto, Canada

[21] Appl. No.: 548,819

[22] Filed: Jul. 6, 1990

[51] Int. Cl.⁵ .............................................. G06K 9/20
[52] U.S. Cl. ...................................... 382/61; 382/67; 382/1; 235/456
[58] Field of Search ..................... 382/61, 1, 46, 8, 48, 382/67; 235/494, 436, 454, 433, 495, 456, 487; 364/518, 237.83, 709.10, 709.11, 225.6

[56] References Cited

U.S. PATENT DOCUMENTS

| | | | |
|---|---|---|---|
| 3,618,018 | 11/1971 | Johnston | 340/146.3 AH |
| 3,820,067 | 6/1974 | Shepard | 340/146.3 H |
| 3,885,229 | 5/1975 | Negita et al. | 340/146.3 H |
| 4,157,783 | 6/1979 | Muster et al. | 235/379 |
| 4,178,503 | 12/1979 | Corwin | 235/495 |
| 4,255,653 | 3/1981 | Borkat et al. | 235/495 |
| 4,300,123 | 11/1981 | McMillin et al. | 382/61 |
| 4,633,507 | 12/1986 | Cannistra et al. | 382/61 |
| 4,677,551 | 6/1987 | Suganuma | 364/401 |
| 4,677,585 | 6/1987 | Ikegami et al. | 364/900 |
| 4,855,579 | 8/1989 | Hancock et al. | 235/456 |
| 4,857,715 | 8/1989 | Koch et al. | 235/456 |
| 4,933,984 | 6/1990 | Nakano et al. | 382/61 |
| 4,937,439 | 6/1990 | Wanninger et al. | 235/456 |
| 4,970,712 | 11/1990 | Tsuruoka et al. | 235/456 |

Primary Examiner—Michael Razavi
Attorney, Agent, or Firm—Donald E. Hewson

[57] ABSTRACT

Apparatus is provided whereby a template for a preprinted survey page is developed and captured as a computer data file, so that a number of pre-printed pages having the same form may be analysed to determine the presence or absence of a mark in each response position found on that form. The forms are analysed by feeding them, seriatim, to a reading station where a digital image of each form is captured using one or more video cameras. The same station is used to set up the template in the first instance, whereby data determining reference frame lines, landmark and whitemark positions within the reference frame, and response positions, may all be pre-determined. A plurality of cameras may be used for each pre-printed page, each camera viewing only a small portion of the page, with the fields of the cameras overlapping to some extent. By establishing spaced apart landmarks, and establishing the absolute values for landmarks which are printed on the page and whitemarks where no mark is expected on the page, the limits of greyscale may be determined for the page whereby the presence or absence of a mark in an expected response position may then be determined. If necessary, algorithms may be changed for broader searches at each response position to determine whether or not a response is made at that position.

10 Claims, 4 Drawing Sheets

FORM 1076

SURVEY QUESTIONNAIRE

SEX  ☐ MALE  ☐ FEMALE

AGE  ○ 19 - 25  ○ 26-40  ○ OVER 40

MARITAL STATUS  ○ MARRIED  ○ SINGLE
                ○ DIVORCED  ○ WIDOWED

SMOKER  ( ) YES  ( ) NO

BRAND PREFERENCE

|  | A | B | C | D |
|---|---|---|---|---|
| SOAP | ○ | ○ | ○ | ○ |
| CIGARETTES | ○ | ○ | ○ | ○ |
| BEER | ○ | ○ | ○ | ○ |
| AUTOMOBILE | ○ | ○ | ○ | ○ |
| NEWSPAPER | ○ | ○ | ○ | ○ |
| . . . |   |   |   |   |
| . . . | ○ | ○ | ○ | ○ |
| . . . |   |   |   |   |

OFFICE USE ONLY

THANK YOU

Figure 4

METHOD AND APPARATUS FOR OPTICALLY READING PRE-PRINTED SURVEY PAGES

FIELD OF THE INVENTION

This invention relates to optical mark readers, particularly to an apparatus and method for optically reading pre-printed pages and for determining the presence or absence or marked responses on the pages in pre-designated positions thereon. The present application teaches particularly various typical configurations of apparatus devised to read pre-printed forms and to analyse the survey data marked theron, and methods by which such analysis may be carried out.

BACKGROUND OF THE INVENTION

There is an increasing reliance on the use of survey data by all sorts of business and political entities. For example, manufacturers of mearly any consumer commodity rely heavily on survey data to advise them whether the products being manufactured by them meet criteria established by the general buying public, which criteria may change from time to time. Political parties are parricularly dependent on survey data for determination of policy.

Surveys may be used, as well, to determine whether a specific individual who responds to a survey may receive one or a number of promotional discount coupons, for example, depending on the pattern of responses that he has made to a given survey. Surveys may also be utilized by service organizations and governments to determine the demand for any specific service to be provided to the public, and so on.

The present invention, while discussed hereafter generally in respect of surveys, is directed to an apparatus for reading and analysing any mark responsive pre-printed form. Such forms may be order forms of all sorts or consumer response forms. One widespread use of forms is in educational testing, using multiple choice forms. Another widespread use of pre-printed forms having a plurality of fields, each with multiple choices, is for purposed of inventory control.

Generally, the pre-printed forms have had to be very specific in terms of their set up, and may indeed require the use of particular markers such as a soft pencil with an entire block being filled by the respondent to indicate his response to any particular question. Such pre-printed forms have generally, in the past, been rather unforgiving as to the inaccuracy of placement by the respondent of his mark indicating his response or answer to any given question, with the result that the survey data may be inaccurate or the analysis of the survey may require human intervention to determine whether an apparent answer is really to be intended.

Other problems that occur in previous mark reading devices and methods are the inability of the prior art devices to permit or make adjustments for rotational displacement (within limits) and/or horizontal or vertical alignment problems (within limits). Often, especially when the prior art device requires use of an optical character reader, there are very tight tolerances for paper placement in the machine for analysing the response, and for placement of the responses on the paper in very tightly defined areas.

In general, the present invention overcomes a number of problems of the prior art by providing an apparatus that may utilize a plurality of video cameras, where each camera may review only a portion of a respose page. A plurality of computer may be used, which permits a faster analysis of a plurality of survey forms—which may, in some circumstancs, amount to an analysis of thousands or hundreds of thousnds of individual documents. The use of a plurality of cameras removes any restrictions or constraints as to the size of the pre-printed form—that is, th size of the form is virtually unlimited, the constraint being imposed on the paper handling apparatus that will be used when the forms are read and analysed in keeping with the present invention. Moreover, the use of a plurality of cameras permits for a higher pixel density, thereby assuring greater certainty of mark analysis, and as well allowing for a greater packing density of responses—more response positions per page.

Compensation may be provided for scaling, that is for allowances of size of the pre-printed form, within limits. Sometimes, survey forms may be photocopied, and the size of the copy may vary by as much as two percent or more from the original. Moreover, pre-printed forms may be printed on various grades of paper under various relative humidity conditions, and humidity conditions may change over the period of time when the survey results are being analysed, each such condition having some effect on the physical size of the page.

With the present invention, a plurality of templates may be set up, one for each video camera which is used to review a page of a survey form, and a plurality of groups of templates may be set up to accommodate for multi-page survey forms. In other words, a particular survey may have one, two, four, or more, pages, and templates may be set up so that all that is required is certain physical handling to ensure that the pages that are presented to the apparatus are in the order that the apparatus expects them. Indeed, by matching templates against an image of a document being analysed, and determining a gross mis-match, the apparatus and methods according to the present invention will intercede and signal to the operator that perhaps the wrong form is being used. On the other hand, on certain advances of the present invention, rotational displacement in multiples of 90° might be accommodated, but more usually all survey forms are stacked in the same displacement so as to speed up the analysis of the documents.

The methods provided by the present invention may be carried out on a number of different kinds and complexities of apparatus. In general, the present invention provides a method of optically reading a pre-printed page so as to determine the presence or absence of marked responses on that page in pre-designated positions, where the pre-designation of those positions is not otherwise a factor. In other words, anywhere on the page there may a pre-designated position for a response, and the present invention will provide for determination as to whether there is a mark in that position on the survey form being reviewed.

The invention calls for the steps of:

placing the pre-printed page in the field of a video camera, viewing the pre-printed page, making a digitized image of the pre-printed page, and storing the digital values of the digitized image in a computer memory;

imposing on the digitized image data of the pre-printed page data, further data describing at least two horizontal reference lines and at least two vertical reference lines that are spaced apart vertically and horizontally, respectively, so as to set up a reference frame, for which reference frame relative response positions are to be examined for the presence or absence or marked responses;

imposing on the digitized image data, further data describing at least a first landmark position relative to said reference frame, where said first landmark position is at a place on the pr-printed page relative to the said reference frame where a pre-printed mark is always to be found;

imposing on the digitized image data, further data describing at least a first whitespace position which is at a place on the pre-printed page relative to said reference frame where a mark is never expected to be found; thereby establishing for the pre-printed page absolute references to allow determination of the presence and absence, respectively, of markings on said page;

imposing on said digitized image data, further data describing a reference for every response position relative to said reference frame, where the presence or absence of responses on said pre-printed page are to be determined;

writing all the reference line, landmark, whitespace, and response position data, to a computer template data file;

repeating the above steps for as many video cameras as are to be used for optically reading said pre-printed page;

establishing analysis algorithms for determining the presence or absence of a mark at each response position, so that by comparing the digital value of the signal read at each response position with the digital values of the landmark and whitespace data, the presence or absence of a mark at each response position may be determined;

and thereafter, placing a marked pre-printed page in the field of said at least one video camera, digitizing the image from said at least one video camera and comparing it to the template data file for expected response and confirmation that the reference frame is found; and when the reference frame is found, determining the presence or absence of a mark in each response position by using such algorithms as may be necessary for such determination;

repeating the above steps for as many video cameras as are to by used for optically reading said pre-printed page;

capturing and writing to a computer data file, the data for all responses noted on the pre-printed page; and repeating the above digitizing, comparing, algorithm analysis, and data capture steps, for as many pre-printed pages as there are to be optically read and analysed.

Other steps may particularly be followed, as noted hereafter, to enhance or speed up or otherwise optimise the analysis of a pluralility of pre-printed pages having survey data marked thereon.

PRIOR ART

Several prior art patents are of general interest as being indicative of certain problems encountered previously. They include particularly KEANE et al, U.S. Pat. No. 4,760,247, issued July 26, 1988. Keane et al, disclose an optical reader that reads marks on the face of a pre-printed card, including a video camera, a digitizer, and a processor. However, Keane et al, do not disclose the use of an operator set up whereby landmarks and other visual identifiers may be defined in a template, thereby permitting not only the random placement of response positions on the form, but permitting greater certainty of determination as to whether a mark exists or does not exist at any given response position, as in the present invention. In deed, the present invention differs significantly from Keane et al, because it provides for a form that is not explicitly one that is obviously intended to be read by a computer, whereas Keane et al must provide such a form because they rely on positioning lines and indices printed on the card. Keane et al do provide for compensation for detecting an image versus the expected image, that is for providing an assignment of a number which is representative of greyscale between a positive presence and a positive absence of a mark. They do provide for a markable area where the sum of density values may be less than a preliminary threshhold value, but there is no further compensation or deeper levels of determination algorithms which may more positively identify the presence or absence of a response in a given response position. Moreover, there is no discussion by Keane et al of any use of multiple computers, or compensation for scaling, translation or rotation, as discused above. Neither do Keane et al provide any manner for handling multiple camera inages, whereby a single page may have a number of cameras trained on it and the overlapping fields of the cameras analyse only relatively small portions of the cage. There is no provision in Keane et al for handling multi-page forms, having a plurality of templates or groups of templates.

JOHNSTOM, U.S. Pat. No. 3,618,018, issued Nov. 2, 1971, provides for a scan control apparatus which can selectively scan areas of a document for information included in those areas, without having to scan the entire document. A set of coordinates which outline a document area within which data may appear may be defined responsive to a format word, but the entire system is cumbersome.

NEGITA et al, U.S. Pat. No. 3,885,229, issued May 20, 1975, provide a scanning apparatus which detects a reference mark and a tilt mark on the document to be scanned. The detected data is then stored and used to determine an absolute position for the start of reading. Once again, however, the process and aparatus provided by Negita et al require the use of physical marks which are clearly intended to be used by a computer, and are clearly understood by the person filling out the document to be for those purposes. This takes away from any feeling that the respondent may have that the time that he is taking to fill out the survey form and to provide data will be personally reviewed by someone who is requiring that information.

SCHROEDER, U.S. Pat. No. 4,204,193, issued May 20, 1980, discloses yet another scanning apparatus which detects within a field defined by marks that are physically to be found and set out on the form or document itself. The Schroeder device requires a particular pattern to be recognized; whereas the present invention merely requires that there be a mark or the absence of a mark within a given response position.

McMILLIN et al, U.S. Pat. No. 4,300,123 issued Nov. 10, 1981 provides a scanning apparatus within which templates are provided that are known by the processor. In this case, the template is separately programmed so as to provide a number of templates or masks of field in which information may be read fom particular record vocations. The field programs may be stored in PROM's, or they may be user chosen by means of a host computer. The system does not use landmarks or other field identification template information as the present invention does.

KASHIOKA et al, U.S. Pat No. 4,334,241, issued June 8, 1982 provides yet another system for detecting patterns of responses. In this case, the local pattern is compared with a standard pattern using positional coordinates.

YODA et al, U.S. Pat. No. 4,346,405, issued Aug. 24, 1982, is one which looks to visual information processing apparatus which detects a change in image with the lapse of time.

All of the above prior art shows the current state of the art where the systems typically have many limitations. Those system may impose constraints on the design and production of readable forms such as by determining the locations where response positions may be situated; they may require the use of special papers and inks, particularly where one ink is not sensed by the scanning apparatus and the other is to detemine the presence or absence of a response. Most prior art systems require very high or nearly perfect registration of the printed form with respect to the paper edges in the scanning apparatus. Where two colour printing is required, this creates an additional constraint due to the requirement for there to be registration of both ink colours. Often, the respondent is required to make his response by marking only with specific writing instruments such as a soft pencil or to make specific marks such as by filling in an entire box. Still further, all of the prior art requires the use of absolute references, whereas the present invention is always operative in a sense that is relative to an established reference frame.

The present invention overcomes those constraints by eliminating or permitting much greater latitude as to the design of form to be analysed, the manner in which it is marked, the speed with which it may be analysed, and the disposition of reliance on a fixed reference frame.

The present invention thereby provides for the use of differnt kinds of paper as to their weight and colour, provided that the mark on the paper has sufficient contrast from the paper that the presence or absence of a mark may be determined with considerable certainty. The respondent may use almost any kind of mark such as a X, a check mark, a filled in box, and so on, and still have the mark being detected. Because there is considerable freedom as to the placement of the response positions on a page, there need only be one ink colour used for printing the pre-printed page. Accurate registration of the printing with respect to the paper edges is not required, since the invention requires the setting up of a template including a reference frame on the page without regard to the position of the paper edge, within limits. Obviously, any kind of standard form such as a survey, application form, an academic test, an inventory or order form, a consumer response form, etc, may be read; and equally as obviously, any kind of writing instrument such as a pen, a pencil, a marker, etc, may be used.

As will be noted hereafter, it is clear that multi-page documents can be scanned and interpreted in sequence. The present invention will provide for automatic numbering of any form, so that the responses on a given form which may have a number of pages may be collated together for determination of a complete response analysis.

As noted, the presnet invention will provide for certain rotational and translational mis-alignment of the form in the reader as the forms are being analysed. Moreover, the present invention will permit scaling within limits so that each form need not be of a specific size within close tolerances.

Finally, the present invention provides for the set up of documents which have no obvious markings on them which indicate to the respondent that the form is to be machine readable. That means that the respondent may have more willingness to fill out the form with the expectation that the form will be reviewed by a person, whereas in fact the form may be reviewed along with many thousands of like forms using apparatus and methods according to the present invention with very high certainty that the respondents responses will be accurately determined and utilized as appropriate.

BEIEF DESCRIPTION OF THE DRAWINGS

The present invention will be described in detail below, with reference to the accompanying drawings, on which:

FIG. 4 shows a typical lay-out of a survey questionaire that might be analyzed according to the present invention, showing a number of features as to the utilization of the present invention.

DESCRIPTION OF THE PREFERRED EMBODIMENTS

Figure 1:
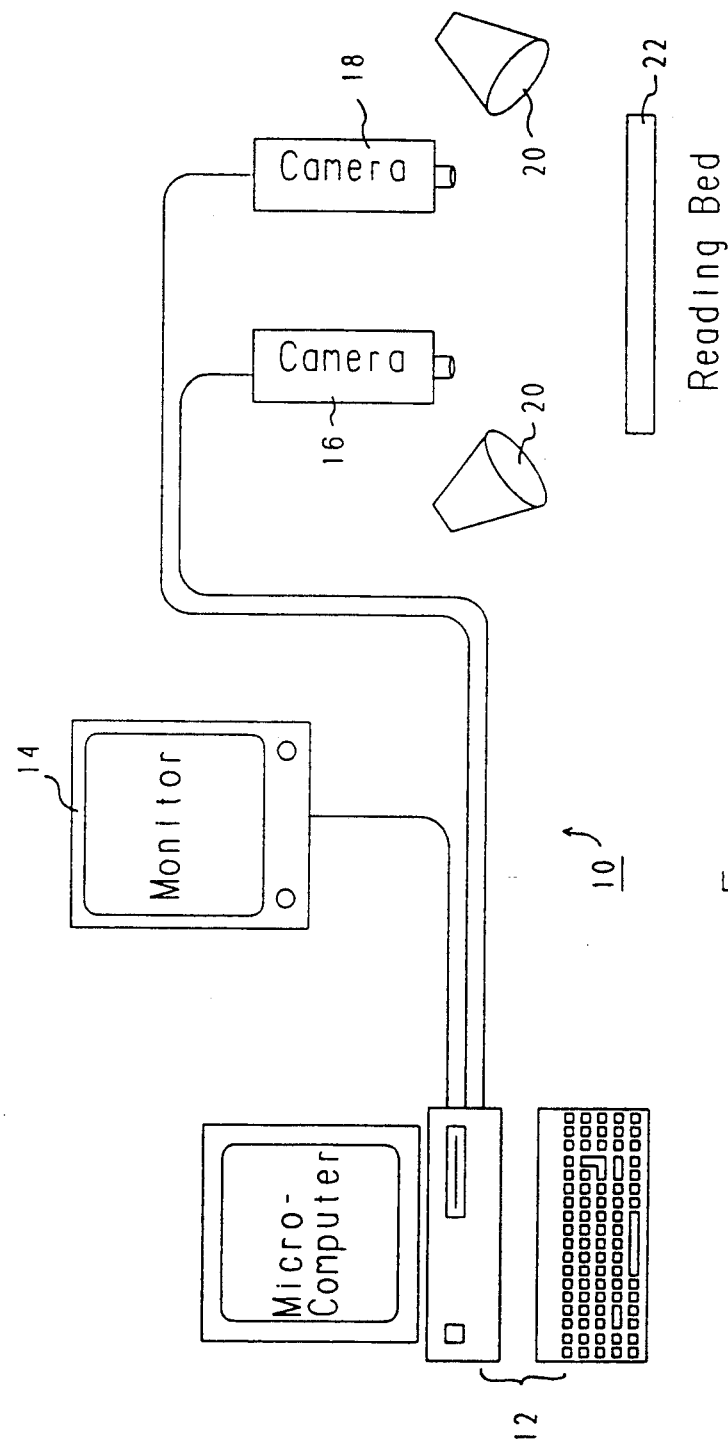
FIG. 1 is a notional schematic showing the general physical set up of a very simple system according to the present invention.
Figure 3:
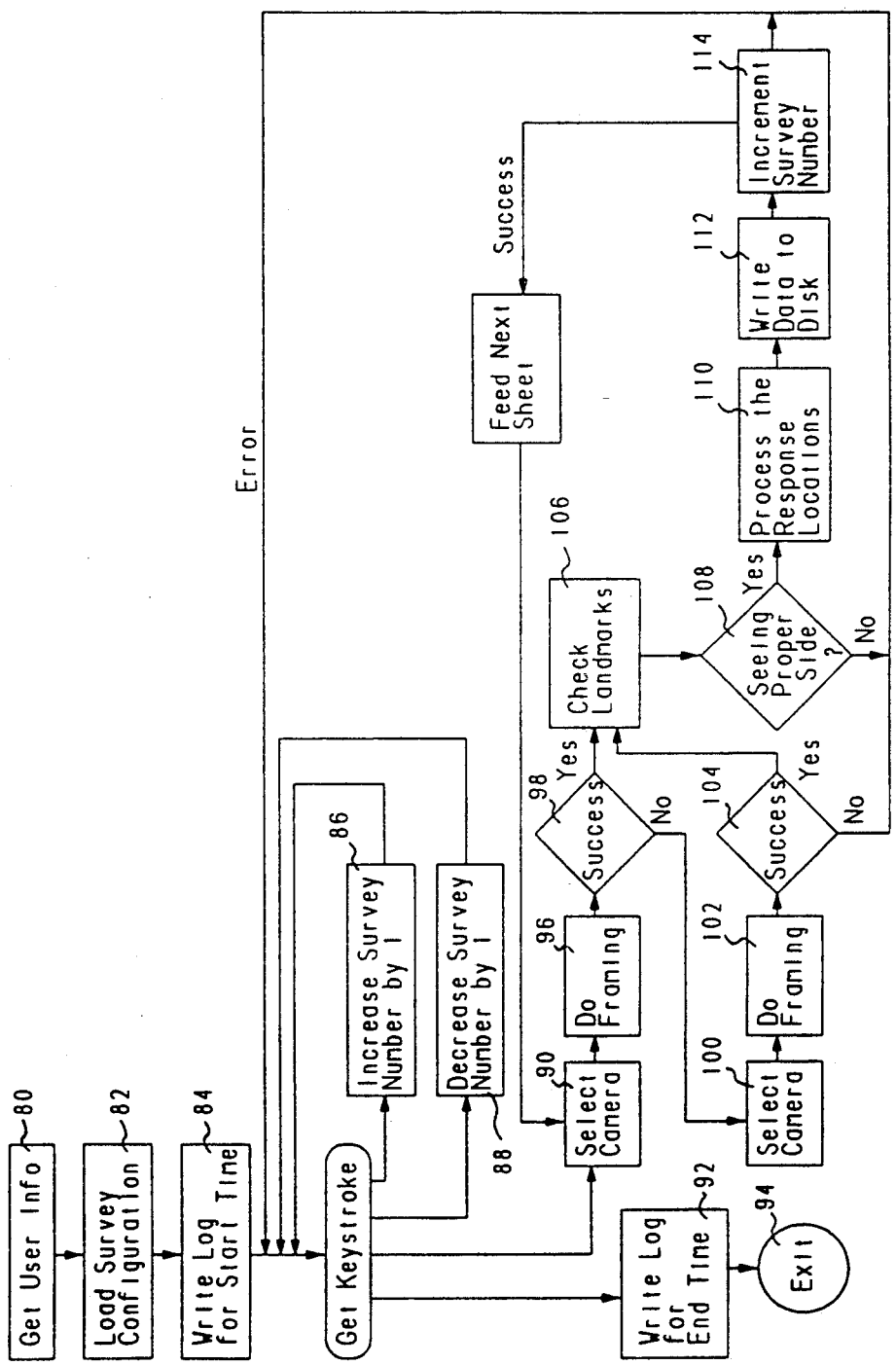
FIG. 3 is a flow diagram of the logic used in following the process of the present invention to analyse pre-printed forms having respondent's marks on them.

Reference will be made generally to FIGS. 1, 3, and 4.

FIG. 1 shows a basic set up for an apparatus 10 according to the present invention. The apparatus comprises a computer 12, a separate video monitor 14, video cameras 16 and 18, lamps 20, and a reading bed 22 on which documents to be analyzed are placed. Whether the apparatus is a simple as that shown in FIG. 1, or more closely resembles that of FIG. 2 having a plurality of components as discussed hereafter, is a function of the complexity and cost of the apparatus, but each will operate in essentially tha same manner as described below.

Figure 2:
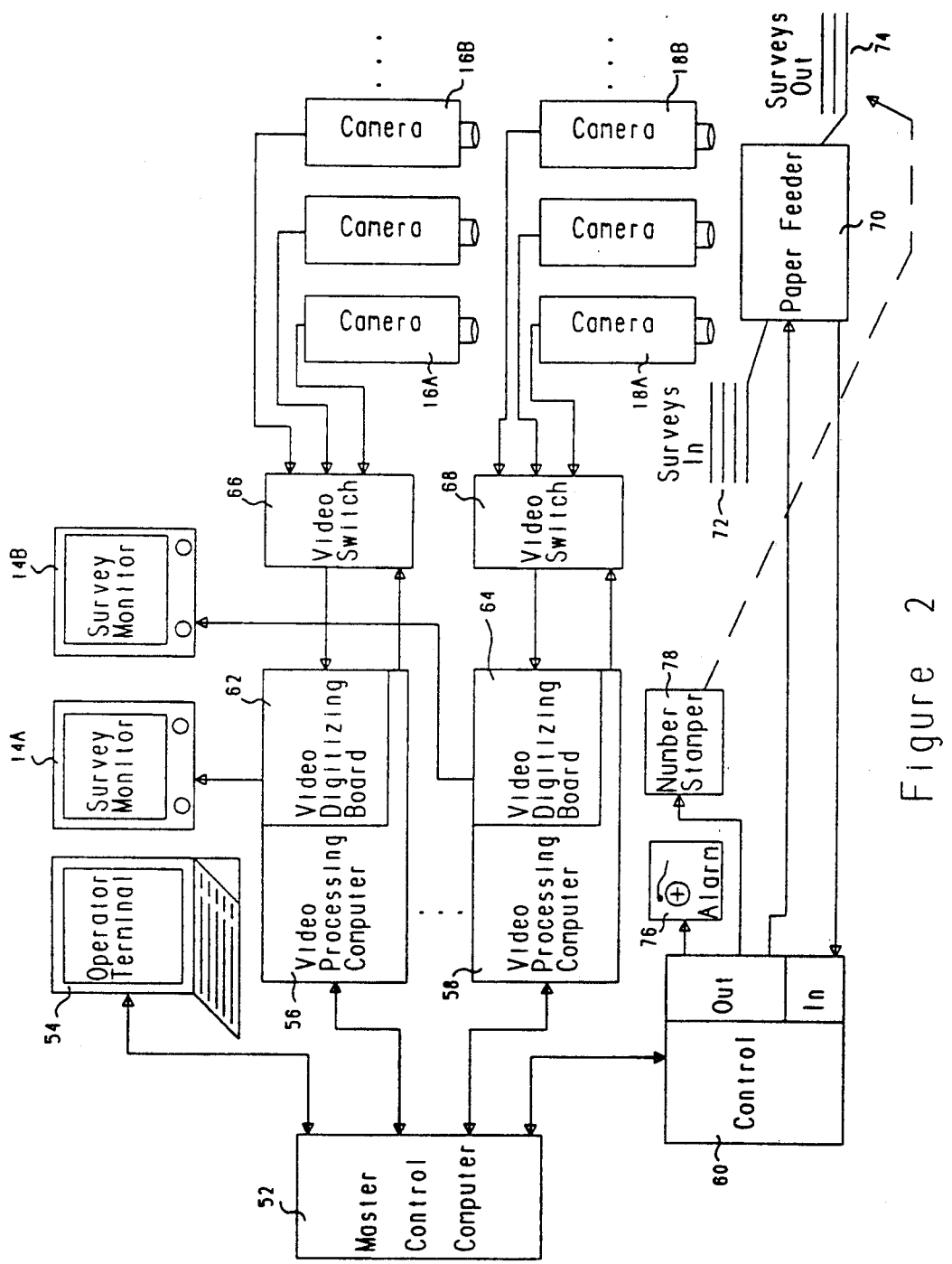
FIG. 2 shows a set up which is similar in general to that of FIG. 1, but which is automatic, and is considerably more complicated, having greater numbers of operating components.

The flow diagram of FIG. 2 is one which particularly applies to the analysis of a pre-printed form, after the template has been set up in the first instance. That process is described in greater detail hereafter.

FIG. 4 shows a typical type of set up for a survey questionnaire, showing the manner in which response locations may be placed anywhere on the document, and showing the manner in which the document is framed and templates are set up for the analysis of the response indicated on the document.

Referring to FIG. 1, with regard to FIG. 4, a document such as that of FIG. 4 is first placed on the reading bed 22. Then, a digitized image of at least a portion of the document is made using the first video camera to be used in setting up the template, where the digital value of the digitized image is stored into the computer memory of the computer 12. For the purposes of the present discussion, it will be assumed that the form of FIG. 4 is such that it may be read by a single camera 16; if the form contains maore response positions, additional cameras may be used so as to speed up the analysis of the documents when they are being read.

In any event, a first position is imposed on the digitized camera image by establishing what is, in essence, a starting point. That point—which does not appear on the form, but appears on the digitized image of the form as it shows up on monitor 14—is shown in FIG. 4 at 24.

From there, at least two horizontal reference lines may be established, as shown at 26 and 28, and two vertical reference lines as shown at 30 and 32 may be established. The reference lines 26, 28, 30, and 32, together comprise and establish a reference frame. It is relative to that reference frame that the response positions are to be examined for the reference or absence of marked responses. The response position need not be within the reference frame, but their position is determined relative to the reference frame.

Having established the reference frame, it is usual to recapture the data and the search for each reference line to ensure that the template is being generated. From now on, when a document such as that shown in FIG. 4 is analysed, it is the reference frame which determines where the search for specific locations will be made, not the absolute locations of the search locations with respect to the edge of the page or the placement on the reading bed.

Next, positions are located by obtaining data which describes at least one and usually two or more landmark positions, whose position is determined relative to the reference frame. The landmark positons may be any pre-printed material within the reference frame, and need not be specific framing lines or points as is found in the prior art. Thus, for the present discussion, two landmark positions may be noted as being, for example, the letter "S" and the letter "K", as shown at 34, and 36. These merely define landmarks which are always to be found on the pre-printed page, from which data can be referenced as described below. The lankmarks amy be the framing lines 26, 28, 30, and 32, when they are printed on the form page.

At the same time, further data is determined for at least one and usually two whitespace positions at places on the pre-printed page relative to the reference frame, where a mark is never expected to be found. For example, a whitespace position may be that area in the heading of the document bounded by the letter "Y" and the letter"Q", as noted at 38, and it may be spaced as particularly noted at 40. Indeed, several whitespace may be used, and in general the greyscale determination of the presence or absence a mark is determined by the relative value of the greyscale compared to the whitemark, or compared to the closest whitemark, or a pre-determined whitemark where necessary. This allows for several problems that may occur when the pre-printed forms to be analysed are fed to the apparatus for reading and analysis. In particular, when the form is larger or there may be problems in terms of setting up of the lighting, a plurality of whitespaces may be determined. Other circumstances may involve the use of multi-coloured forms, for example government forms which have coloured background, where the certainty of the persence of a mark is determined by measurement of the greyscale with respect to a "whitemark" that may be determined within the coloured background. This also permits for compensation of uneven camera readings, since it is known that video cameras may detect less apparent lighting at their edge than in the centre of the frame which they are viewing.

Having regard to the value of the data as to the whitespaces 38 and 40, absolute reference may be determined by which the presence or absence of markings on the page may later be determined. What these values establish is the limits of the range of greyscale reading from dark as to the lankmarks 34 and 36—which may be limted by data—to light, as the whitespaces 38 and 40.

Next, reference data may be imposed on the digitized image for every response position relative to the reference frame. Typically, the reference data for each of the response positions is determined by the operator by simply placing a cursor over each response position on the digitized image as it shows on the monitor. This is most easily done using a mouse associated with the computer 12, but it may be accomplished using the cursor controls of the computer. In any event, by such operations the data for each response position relative to the reference frame are captured, without the need for any programming on the part of the operator. Typical response positions are indicated at 42, 44, 46, 48, and 50.

It will be noted that the first grouping of response positions are essentially randomly located, whereas the last grouping is more or less what would normally be expected in terms of rows and columns of response positions. It will also be noted that the response positions may be identified by a variety of markings such as a square block, the use of a set of parenthesis, or a circle, all as noted in FIG. 4. In any event, each and every one of the response positions is identified, and the data as to those positions relative to the reference frame, are imposed on the digitized image data. Then, all of the reference line, landmark, whitespace, and response position data, are written to a computer template data file.

The above steps may then be repeated for as many video cameras as there are to be used for optically reading the pre-printed page, which may range in number from 1 to 10 or more cameras.

Analysis algorithms are established for determining the presence or absence of a mark at each of the response positions. By comparing the digital value of the signal read at the response position when the data is being analysed, with the digital values of the lankmark and whitespace data, the presence or absence of a mark at each response position may be determined. In general, there can be considered to be four possible responses: they may be designated as False (F), Blank (B), Mark (M), and True (T). These represent the various confidence levels of determining the absence or presence of a mark at any pre-determined response location. False is an absolute confidence level that there is no mark; True is an absolute confidence level that there is a mark; Blank and Mark are doubtful confidence levels as to the probability that there is no mark, and the probability that there is a mark, respectively. Where, upon analysis, any of the data for any response location are determined as being B or M, further algorithms may be referred to so as to determine whether there is, in fact, the absence or presence of a mark. Such algorithms are discussed below, by way of example.

All of the load survey configuration, including the template and analysis algorithms, are then capable of being loaded into the system and into the computer—or into a series of video processing computers as described hereafter. Thereafter, a marked pre-printed page is placed on the reading bed, and the image of that pre-printed page is digitized using the video carmeras, and compared to the template data file for expected response and confirmation that the reference frame has been found. When it is confirmed that the reference frame has been found, the digital image is analyzed to determine the presence or absence of a mark in each of the response positions. Deeper level algorithms may be necessary when the response positions are other than F or T, as noted above.

The reading and determination steps are repeated for as many video cameras as there are to be used for optically reading the pre-printed page on the reading bed. Thereafter, the data for the reference locations is captured and written to a computer data file, so as to note all of the responses on that pre-printed page. Generally, the page is assigned a serial number, and the serial number is written with the data, for recovery purposes later. At the same time that the serial number assigned to the page is written to the analysis data in the computer, it is imprinted on the page. This may be accommodated by use of such a device as an injet printer, as noted below. By imprinting the serial number assigned to the page at the same time that the data recovered from that page are written to the data file, it is assured that there will be no skewing of the data when recovery of the data is carried out at a later stage.

The next pre-printed page is then placed on the reading bed, digitized, compared, analysed, and its data captured as described above. This procdure goes on for as many pre-printed pages as there are to be read and analyzed.

As noted, there are generally two spaced lankmark positions within the reference frame, so that when the reference frame is first determined and the positions of the landmarks noted, the computer can decided whether the form that it is expecting is, in fact, on the reading bed. Having made that determination, a determination can then be made as to the precise coordinates of the response locations relative to the reference frame, because on a pre-printed page they would not vary with respect to the reference frame except as to scaling. Rotational and/or transational displacements can be accommodated simply by recalculating the template expectation positions, and reading them. This has the effect of rotating and/or translating the template so that the landmark positions and the templates expectation positions are coincident. Scaling can be accommodated within limits of several percentage points of the size of the reference frame by applying an enlargement or reduction factor to the digitized image to fit of the template.

When the analysis algorithms are being used to determine the gross digital value of the mark found in any response poistion, one way of making that determination is for there to be a calculation of the gross digital value of the marks found in a pre-determined number of digitized image pixels for eeach response position. This value is then compared to threshold values to determine whether the mark is either white enough or dark enough to provide a signal of F or T—thereby determining the absence or presence of a mark. If, however, the value of the digitized image pixels for the response position falls into another range, additional pixels surrounding the positon may be examined. With broader searches thereby permitted, having more pixel positions being examined, this permits the determination with greater certainty of the presence or absence of a mark at the response position in question.

Referring briefly to FIG. 2, a master control computer 52 is shown, and it controls and inter-connects with a number of other pieces of equipment including an operator terminal 54, video processing computer 56 and 58, and solid state relays on block 60. The video processing computers 56 and 58 have video digitizing boards 62 and 64, which connect to survey monitors 14A and 14B. The video digitizing boards are connected through computer controlled video switchers 66 and 68 to a series of cameras 16A, 16B etc, and 18A, 18B etc, respectively.

Below the cameras is a paper feeder 70, with which is associated a stack of surveys to be read at 72 and a stack of surveys that have been read at 74. The paper feeder is controlled from the solid state relay boxes; and in the event of a situation which is not allowed for, an alarm 76 may be sounded. As each survey is read, it may be imprinted by a printer 78—which may be a computer controlled inkjet printer—with its own individual serial number. The operation of the circuit of FIG. 2 is, however, essentially the same as described above. It should also be noted that FIG. 2 contemplates the use of a heirarchical circuit, where one computer controls a number of other computers, and where in any event multiple computers are being used.

Having regard to FIG. 3, when a stack of surveys 72 is to be analysed, the first step is that the user information is determined as at block 80. The survey configuration data is then loaded, being all of the necessary templates as described above, and indicated in block 82. A log may be written for the start time of the job as at 84.

Then, keystrokes may be entered by the operator sitting at terminals 54, or they may be automatic. The keystrokes include such items as increasing the survey number by one as in block 86, or decreasing the survey number by one as in block 88. They may particularly include a select camera command as at block 90, or they may comprise a keystroke which writes the log for the end time of the job at 92 permitting exit at 94.

Having regard to the select camera step 90, the framing operation is carried out at step 96. Success is determined at 98, and if there is no success a second select camera step is chosen at 100. Framing is again carried out at 102, and success is again determined at 104. In the event of no success from step 104, the program loops to a demand a keystroke which may increase or decrease the survey number, or which may again begin a camera selection, or it may end the job.

Upon success at either 98 or 104, the landmarks on the page are first checked at 106. A determination is made at 108 by finding the landmarks from 106 whether the proper side or pre-printed page is being determined. If no, the program loops back again to a keystroke requirement; and if yes, the analysis process continues as at 110. There, the response locations are processed as described above; thereafter, the information for that page is written to the data file at 112, and a signal to increment the survey number is sent back to the computer. At that stage, the survey page on the paper feeder 70 is ejected to the stack 74 and a new survey page is placed for analysis. The operation of the devices and circuit of FIG. 2 are essentially automatic, requiring only initial keystrokes and, perhaps, keystrokes to end the job.

There has been described apparatus and typical process steps for reading survey data on pre-printed forms or pages, where the data may be placed on the page in essentially random order as to it appearance, because a template for each page or portion of a page is specifically determined. As noted, the present invention accommodates a number of change to the format as to rotational or translational displacement, within limits of a few percent in each instance, and even as to scaling; because the present invention recognizes that the relative position of all response locations to the landmarks and reference frames on the page—which are determined by analysis—remain substantially constant and fixed.

It should be remarked that in general, it is recognized that about 90% or more of all errors in terms of badly marking data or response locations occur on about 10% of all surveys reviewed. Generally, therefore, response forms that are clearly not valid because all or none of the response options may be filled out, or the document may be badly stained or scribbled upon or otherwise defaced, are visually disposed of before the stack of pre-printed pages to be analysed is fed into to the system in keeping with the present invention. This is standard in the industry. Indeed, the present invention provides for initial disposition of the forms which cannot be read. For example, if a respondent has scribbled all over the form, the reference frame may not be detected and an error signal is sent to the operator. In other instances, a respondent may have failed to fill in any response positions—in which case, all of the response positions are analysed as being False—or he may have filled in all of the response positions—in which case, all of the response positions are analysed as being True. In either event, the form is rejected. In still other instances, a first analysis may be made to determine the proportion of the "Block" OR "Mark" marks vis-a-vis "False" and "True" marks. A pre-determined limit or proportion may be established to identify the probability that a form lying outside those limits is not acceptable.

However, it is also recognized that when the forms are analysed visually and key entry made as to the response data, an accuracy of about 97% is accepted. That fact is accepted only because it is recognized that keystroke entry is in any event only about 97% accurate. On the other hand, analysis according to the present invention is consistantly above 99% accurate.

The limits of the invention are defined in the appended claims.

We claim:

1. A method of optically reading a pre-printed page and determining the presence or absence of marked responses on the page in pre-designated positions thereon; the method comprising, for each pre-printed page, the steps of:

placing the pre-printed page in the field of at least one video camera, viewing the area of said pre-printed page within said field of said at least one video camera, making a digitized image of said area of the pre-printed page, and storing the digital values of the digitized image in a computer memory as digitized image data;

imposing on said digitized image data of the pre-printed page further data describing at least two horizontal reference lines and at least two vertical reference lines that are spaced apart vertically and horizontally, respectively, so as to set up a reference frame, for which reference frame relative response positions are to be examined for the presence or absence of marked responses;

imposing on said digitized image data further data describing at least a first landmark position relative to said reference frame, where said first landmark position is at a place on the pre-printed page relative to said reference frame where a pre-printed mark is always to be found;

imposing on said digitized image data further data describing at least a first whitespace position which is at a place on the pre-printed page relative to said reference frame where a mark is never expected to be found; thereby establishing for the pre-printed page absolute references to allow determination of the presence and absence, respectively, of markings on said page;

imposing on said digitized image data further data describing a reference for every response position relative to said reference frame, where the presence or absence of responses on said pre-printed page are to be determined;

writing all the reference line, landmark, whitespace, and response position data, to a computer template data file;

repeating the above steps for as many video cameras as are to be used for optically reading said pre-printed page;

establishing analysis algorithms for determining the presence or absence of a mark at each response position, so that be comparing the digital value of the signal read at each response position with the digital values of the landmark and whitespace data, the presence or absence of a mark at each response position may be determined;

and thereafter, placing a marked pre-printed page in the field of said at least one video camera, digitizing the image from said at least one video camera and comparing the digitized image to the template data file for expected response and confirmation that the reference frame is present; and when the reference frame is present, thereafter determining the presence or absence of a mark in each response position relative to the present reference frame by using such algorithms as may be necessary for such determination;

repeating the above steps for as many video cameras as are to be used for optically reading said pre-printed page;

capturing and writing to a computer data file, the data for all responses noted on the pre-printed page; and repeating the above digitizing, comparing, algorithm analysis, and data capture steps, for as many pre-printed pages as there are to be optically read and analysed.

2. The method of claim 1, where at least two spaced landmark positions within said reference frame are noted and imposed on the digitized image.

3. The method of claim 1, where at least two whitespace positions within said reference frame are noted and imposed on the digitized image.

4. The method of claim 1, where after the reference frame has been determined by said horizontal reference lines and said vertical reference lines, the image of said pre-printed page is recaptured and searched for each reference line.

5. The method of claim 4, where at least two landmark positions relative to said reference frame are noted and imposed on the digitized image.

6. The method of claim 5, where at least a landmark position and at least two whitespace positions relative to said reference frame are noted and imposed on the digitized image.

7. The method of claim 6, where all of the recaptured reference line, landmark, whitespace, and response position data, are written to a computer template data file.

8. The method of claim 7, where the analysis algorithms may be established to determine the gross digitial value of marks found in a pre-determined number of digitized image pixels for each response position; where a first algorithm may be established for all response positions by which the data captured for each response position is compared to the data for the whitespace positions and if a match within pre-determined ranges is found, the presence or absence of a mark at the response position is noted; and where additional algorithms are established which may be used for each response position for a greater number of pre-determined pixels, thereby permitting a broader search with more pixel positions to be examined to determine with greater certainty the presence or absence of a mark at any response position.

9. The method of claim 8, where the comparison of the reference frame data on a pre-printed page to the template data file is followed by the step of determining the relative position of said at least two landmark positions within said reference frame for said pre-printed page being read, and adjusting within pre-determined limits the template including said reference frame and landmark position data to accommodate for rotational or vertical or horizontal displacement of said landmark positions from the positions where they are expected to be within said template.

10. Apparatus for optically reading a pre-printed page and for determining the presence or absence of marked responses on the page in pre-designated positions thereon, comprising:

at least one video camera, and means for making a digitized image of the area of the pre-printed page within the field of said at least one video camera, and means for displaying the digitized image;

computer means having sufficient memory to store template data files and response data files, which files may be written to and updated as necessary;

means for imposing on the digitized image data of the area of said pre-printed page within the field of said at least one video camera further data describing reference lines, landmark positions, whitemark positions, and response positions on the pre-printed page; all of which data is written to a computer template file for that pre-printed page;

additional means for creating as many computer template data files as where are video cameras to be used for optically reading the pre-printed page;

memory algorithm banks within said computer for establishing and applying analysis algorithms to specific digital data for each response location, under control of digital data for each respose location within pre-determined ranges, the algorithm to be chosen being dependent upon the value of the response data and into which pre-determined range it falls;

means for placing and removing a plurality of like pre-printed pages having individually entered responses marked thereon; and means for digitizing the image of each page separately, reviewing the response data for each response location in each template, and recording the response data to a response data file on said computer means.

* * * * *